United States Patent
Angel

(10) Patent No.: US 11,581,787 B2
(45) Date of Patent: Feb. 14, 2023

(54) RESOLVER ASSEMBLY FOR HYBRID MODULE

(71) Applicant: Schaeffler Technologies AG & Co. KG, Herzogenaurach (DE)

(72) Inventor: Scott Angel, Marshallville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 177 days.

(21) Appl. No.: 17/144,705

(22) Filed: Jan. 8, 2021

(65) Prior Publication Data

US 2022/0224205 A1 Jul. 14, 2022

(51) Int. Cl.
| | |
|---|---|
| *H02K 11/00* | (2016.01) |
| *H02K 5/22* | (2006.01) |
| *H02K 15/14* | (2006.01) |
| *H02K 11/225* | (2016.01) |
| *H02K 24/00* | (2006.01) |
| *H02K 15/02* | (2006.01) |
| *H02K 7/18* | (2006.01) |
| *B60K 6/38* | (2007.10) |
| *B60K 6/40* | (2007.10) |

(52) U.S. Cl.
CPC .......... *H02K 11/0094* (2013.01); *B60K 6/38* (2013.01); *B60K 6/40* (2013.01); *H02K 5/225* (2013.01); *H02K 7/1823* (2013.01); *H02K 11/225* (2016.01); *H02K 15/02* (2013.01); *H02K 15/14* (2013.01); *H02K 24/00* (2013.01)

(58) Field of Classification Search
CPC .. B60K 6/38; B60K 6/40; H01F 38/18; H02K 15/02; H02K 15/14; H02K 24/00; H02K 7/006; H02K 7/10
See application file for complete search history.

(56) References Cited

U.S. PATENT DOCUMENTS

| | | | | |
|---|---|---|---|---|
| 6,340,339 | B1* | 1/2002 | Tabata | B60K 6/387 475/5 |
| 7,928,617 | B2* | 4/2011 | Tsukashima | H02K 7/20 310/51 |
| 9,714,028 | B1* | 7/2017 | Moon | B60W 20/50 |
| 11,303,192 | B2* | 4/2022 | Adams | B60K 6/405 |
| 2006/0169526 | A1* | 8/2006 | Honbo | H02M 7/003 180/444 |
| 2011/0031074 | A1* | 2/2011 | Ishii | B60T 13/662 188/156 |
| 2013/0192947 | A1* | 8/2013 | Frait | B60K 6/48 192/3.32 |
| 2014/0070649 | A1* | 3/2014 | Fulton | G01D 5/12 29/598 |
| 2020/0039496 | A1 | 2/2020 | Lindemann et al. | |
| 2022/0072945 | A1* | 3/2022 | Kitada | B60L 50/60 |

FOREIGN PATENT DOCUMENTS

KR 20140084497 A 7/2014

* cited by examiner

*Primary Examiner* — Timothy Hannon

(57) ABSTRACT

A hybrid module comprising a housing, a torque converter, and a resolver assembly is provided. The torque converter comprises a turbine having a turbine shell including at least one blade attached thereto; an impeller having an impeller shell including at least one blade attached thereto; and an impeller hub attached to a radially extending end of the impeller shell. The resolver assembly comprises a rotor connected to an outer surface of the impeller hub and a stator connected to the housing.

20 Claims, 6 Drawing Sheets

RESOLVER ASSEMBLY FOR HYBRID MODULE

TECHNICAL FIELD

The present disclosure relates generally to a hybrid module, and more specifically to a resolver assembly for a hybrid module.

BACKGROUND

Hybrid modules are generally known. Often, it is a challenge to package and/or fit all the desired components, e.g., an e-motor, crank damper, torque converter, torque converter clutch, disconnect clutch, and resolver within the hybrid module architecture due to axial and radial constraints.

SUMMARY

Embodiments disclosed herein provide a hybrid module comprising a housing, a torque converter, and a resolver assembly. The torque converter comprises a turbine having a turbine shell including at least one blade attached thereto; an impeller having an impeller shell including at least one blade attached thereto; and an impeller hub attached to a radially extending end of the impeller shell. The resolver assembly comprises a rotor connected to an outer surface of the impeller hub and a stator connected to the housing.

In embodiments, the hybrid module may further include a resolver hub press-fit onto the outer surface of the impeller hub. The resolver hub may comprise an inner ring portion, an outer ring portion disposed radially outward of the inner ring portion, and an annular wall connecting the inner ring portion and the outer ring portion. The rotor may be disposed and axially retained on the inner ring portion of the resolver hub. In embodiments, the inner ring portion includes a keyhole defined in an outer surface of the inner ring portion; the rotor includes an inner surface and a key extending radially inward from the inner surface; and the key extending radially inward from the inner surface of the rotor is arranged and configured to be received within the keyhole defined in the outer surface of the inner ring portion to position the rotor on the resolver hub. In embodiments, the rotor includes a first axial wall and a second axial wall opposite the first axial wall; the first axial wall is configured to contact the annular wall of the resolver hub when disposed on the inner ring portion of the resolver hub; and the inner ring portion of the resolver hub includes staked portions partially covering the second axial wall for axial retention of the rotor on the resolver hub. In embodiments, a plate arranged to fix the stator to a housing. A connector may fix the plate to the housing and the stator is clamped between the plate and the housing. The connector may also be located radially outside of the stator.

In embodiments, the rotor may be bonded to the outer surface of the impeller hub. In other embodiments, the rotor may be connected to the outer surface of the impeller hub via a press-fit connection or a shrink-fit connection. In other embodiments, the resolver assembly further includes a snap ring; the impeller hub includes a groove defined in the outer surface; and the snap ring is configured to be disposed within the groove to axially retain the rotor on the outer surface of the impeller hub.

Embodiments of this disclosure further provide a method of assembling a resolver in a hybrid module having a housing and a torque converter including an impeller hub attached to a radially extending end of an impeller shell. The method may comprise attaching a rotor of the resolver to an outer surface of the impeller hub; aligning the rotor with a stator of the resolver in an axial direction; and fixing the stator of the resolver to the housing.

In embodiments, the method may include press-fitting a resolver hub onto an outer surface of an impeller hub, wherein the resolver hub includes an inner ring portion, an outer ring portion disposed radially outward of the inner ring portion, and an annular wall connecting the inner ring portion and the outer ring portion. The method may also include locating a rotor on the inner ring portion by positioning a key extending radially inward from an inner surface of the rotor within a keyhole defined in an outer surface of the inner ring portion. In embodiments, the method may include displacing material from the resolver hub onto the rotor to axially retain the rotor on the inner ring portion of the resolver hub. The method may further include providing a plate arranged to fix the stator to the housing. The rotor may include a first axial wall and a second axial wall opposite the first axial wall and locating the rotor on the inner ring portion includes arranging the rotor such that the first axial wall contacts the annular wall of the resolver hub. The method may include displacing material from the resolver hub onto the second axial wall to axially retain the rotor on the resolver hub.

In other embodiments, the method may include bonding an inner surface of the rotor to the outer surface of the impeller hub. In other embodiments, the method may include press-fitting an inner surface of the rotor to the outer surface of the impeller hub or shrink-fitting the inner surface of the rotor to the outer surface of the impeller hub. In other embodiments, the method may include sliding the rotor over the impeller hub such that an inner surface of the rotor is disposed on the outer surface of the impeller hub and inserting a snap ring in a groove defined in the outer surface of the impeller hub for axial retention of the rotor on the impeller hub.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Typically, hybrid vehicles that combine a battery powered e-motor and an automatic transmission driven by a combustion engine will be limited by available space. E-motors require a resolver in order to register the location of the rotating rotor. Therefore, a stationary piece on the outside diameter of the resolver (resolver stator), and a rotating piece (resolver rotor) on the inside diameter are required for proper e-motor function. The resolver takes available space away from inside the transmission of a hybrid vehicle. If the resolver could be combined with another rotating shaft/part inside the transmission, or specifically on the automatic transmission's torque converter, more space can be made available within the hybrid vehicle. Embodiments according to the present disclosure provide a hybrid module with a resolver combined with the torque converter.

Figure 1:
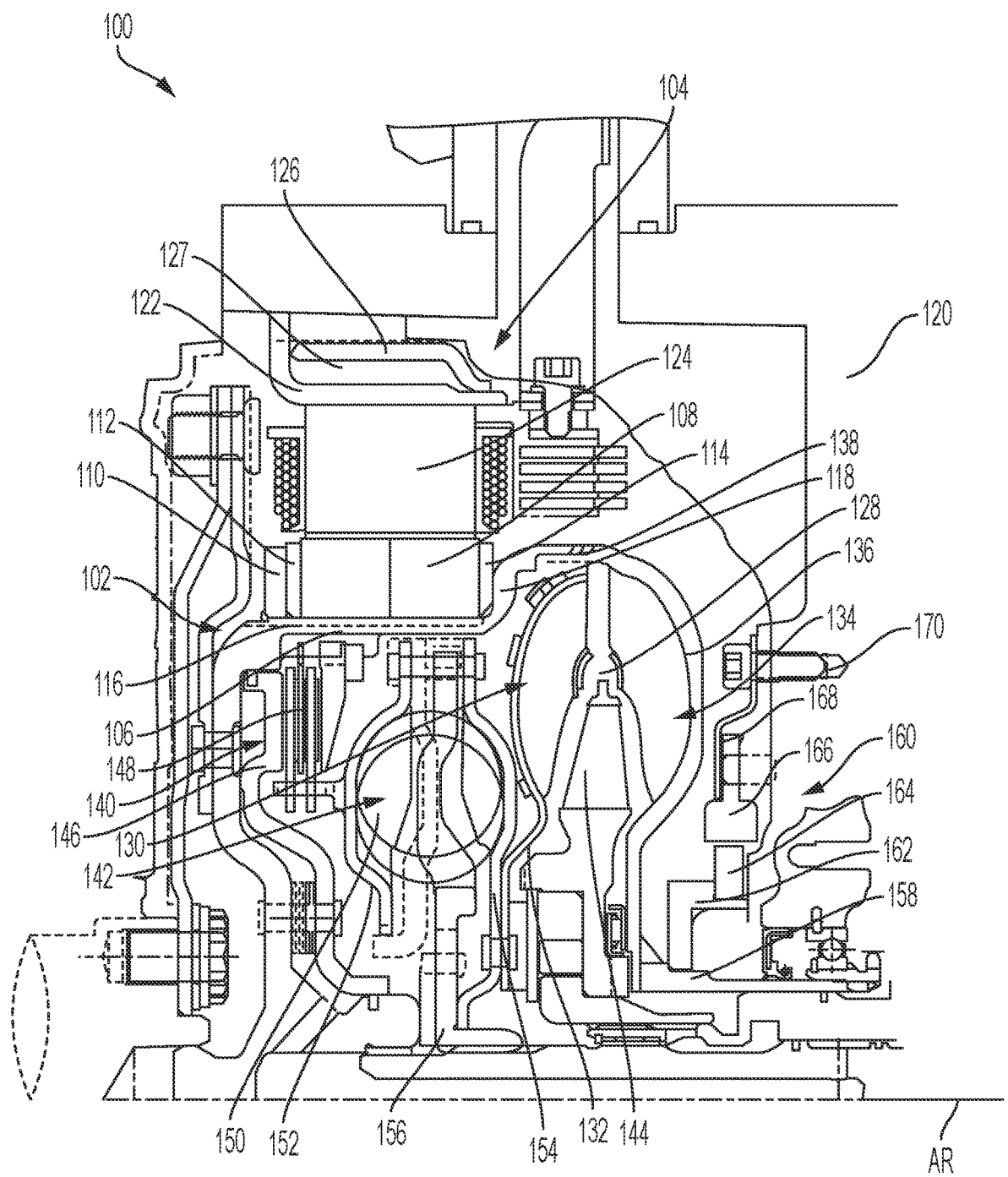
FIG. 1 shows a top half cross-sectional view of a hybrid module including a resolver assembly according to an embodiment of the present disclosure.

FIG. 1 shows a top-half cross-sectional view of hybrid module 100 according to an embodiment of the present disclosure. Hybrid module 100 includes rotor assembly 102 and stator assembly 104 forming an e-motor assembly. Rotor assembly 102 includes rotor carrier 106, rotor segment 108, end ring 110, spring end plate 112, and spring end plate 114. Rotor carrier 106 includes axially extending portion 116 and radially extending portion 118. Rotor segment is installed on an outer surface of axially extending portion 116 of rotor carrier 106. Rotor segment 108 may be a stack of segments, for example. Spring end plates 112, 114 are assembled on opposite axial sides of rotor segment 108. That is, spring end plate 112 is disposed axially between rotor segment 108 and end ring 110, and spring end plate 114 is disposed axially between rotor segment 108 and radially extending portion 118. End ring 110 is configured to compress spring end plates 112, 114 to clamp and/or secure rotor segment 108 to rotor carrier 106 for frictional torque transmission between rotor segment 108 and the rotor carrier 106. Once the desired compression force is achieved, end ring 110 is fixed to the rotor carrier, e.g., by welding.

Stator assembly 104 is disposed radially outside of rotor assembly 102 and is fixed to bell housing 120 for a transmission. Stator assembly 104 includes stator carrier 122, stator segment 124, and water jacket 126. Stator segment 124 may be a stack of stator segments, for example and is mounted on an inner surface of stator carrier 122 by shrink fitting, for example. In other words, stator carrier 122 is heated to expand the inner surface and stator segment 124 is installed thereon. Once stator carrier 122 cools, the inner surface shrink fits to stator segment 124. Water jacket 126 is fixed to stator carrier 122 to enclose sealed chamber 127 therebetween.

Hybrid module 100 further includes torque converter assembly 128 including turbine 130, turbine shell 132 having at least one blade attached thereto, impeller 134, and impeller shell 136 having at least one blade attached thereto. Impeller shell 136 is fixed to rotor carrier 106 at weld 138, for example. Impeller shell 136 and rotor carrier 106 form a housing, or enclosure, for torque converter 128. Lockup clutch 140, damper 142, and stator 144 are disposed within the housing formed by impeller shell 136 and rotor carrier 106. Lockup clutch 140 includes piston 146 and clutch plates 148 for torque transmission between rotor carrier 106 and damper 142. Damper 142 may include: springs 150, cover plates 152, 154 connected to each other radially outside springs 150, and output 156. Cover plate 152 may be connected to at least one of clutch plates 148 and cover plate 154 may be connected to turbine shell 132. That is, cover plates 152, 154 are arranged to act as an input to damper 142.

Torque converter 128 further includes impeller hub 158 connected to an inner end of impeller shell 136, for example, via welding. Impeller hub 158 extends in an axial direction away from impeller shell 136. Resolver assembly 160 is attached to impeller hub 158 of torque converter 128 via resolver hub 162. Resolver hub 162 is fixed to an outer surface of impeller hub 158, for example, via a press-fit connection. Resolver assembly 160 further includes rotor 164 and stator 166. Rotor 164 is fixed to resolver hub 162. Stator 166 is fixed to bell housing 120 via plate 168 and connector 170, for example, a bolt. That is, connector 170 fixes plate 168 to bell housing 120 and stator 166 is clamped therebetween. Connector 170 is disposed radially outside of stator 166. Rotor 164 is axially aligned with the stator 166. In other words, a line can be drawn normal to axis of rotation AR that extends through both resolver stator 166 and resolver rotor 164.

Figure 2:
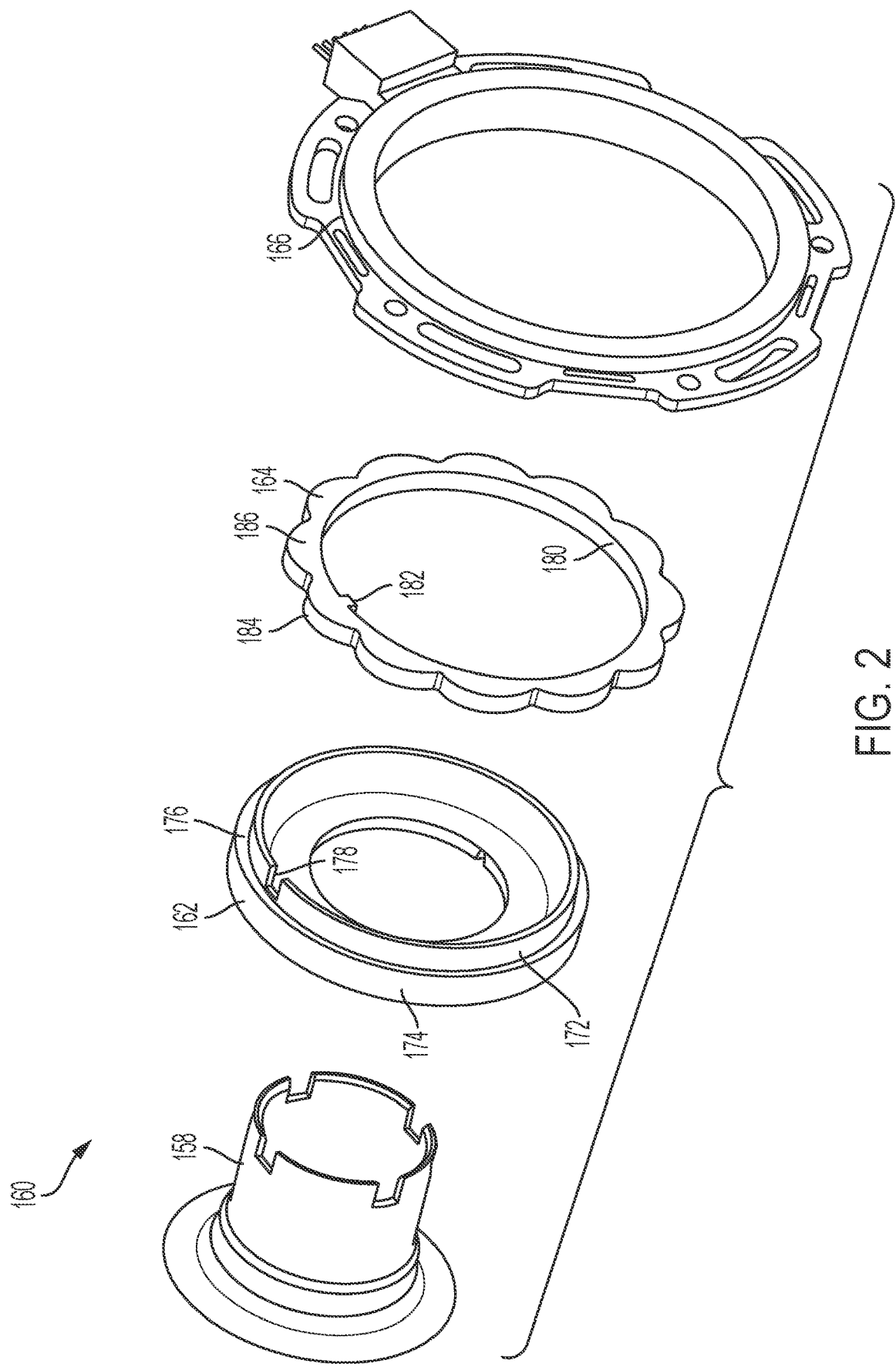
FIG. 2 is an exploded view of the resolver assembly shown in FIG. 1 attached to an impeller hub via a staked connection.
Figure 3:
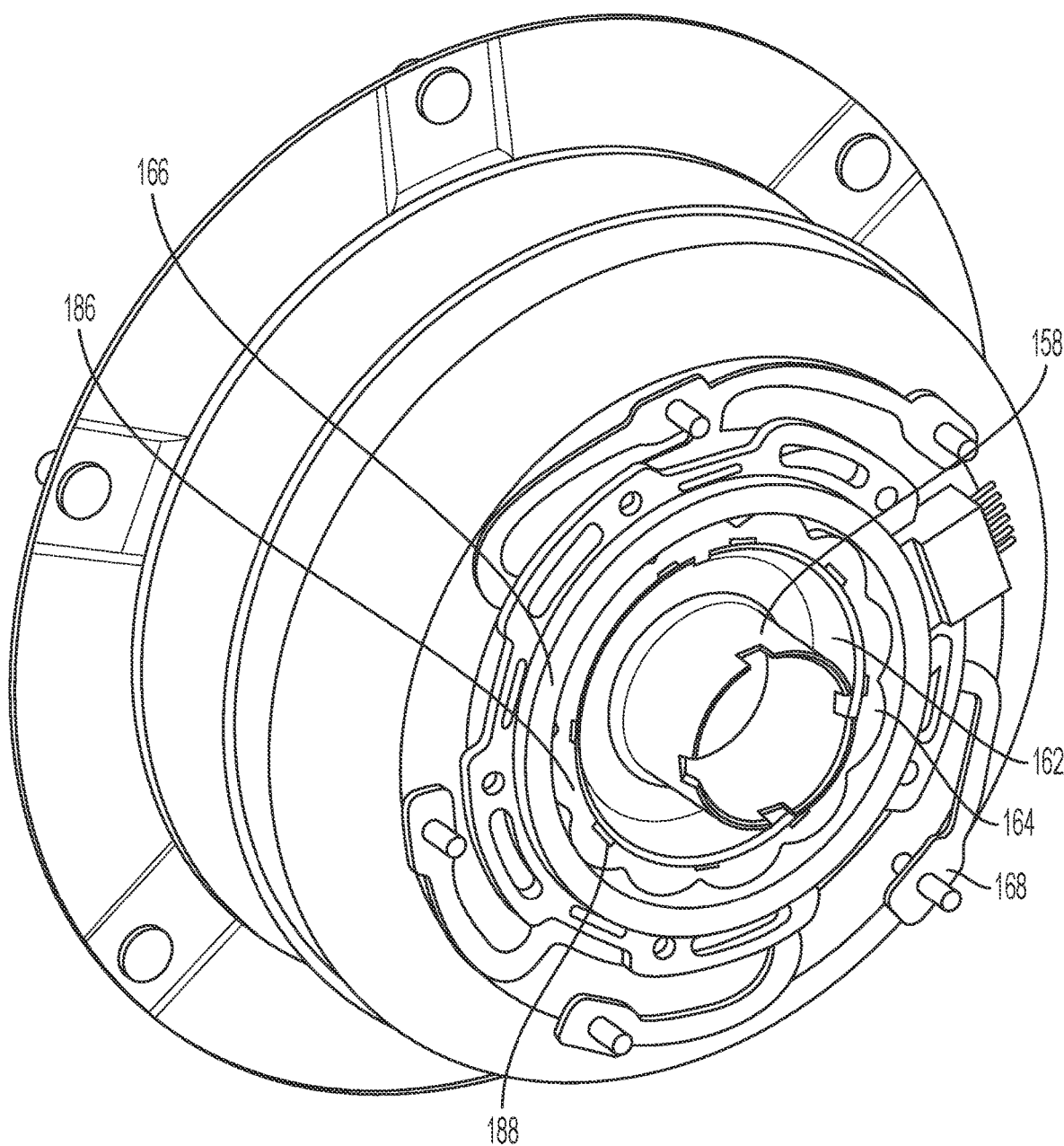
FIG. 3 is an isometric, assembled view of the resolver assembly mounted on a torque converter of the hybrid module shown in FIG. 1.

FIG. 2 is an exploded view of resolver assembly 160 of hybrid module 100. FIG. 3 is an assembled view of resolver assembly 160 mounted on impeller hub 158 of torque converter 128. The following description is made with reference to FIGS. 1-3. Resolver hub 162 further includes: inner ring portion 172, outer ring portion 174 disposed radially outward of inner ring portion 172, and annular wall 176 connecting inner ring portion 172 and outer ring portion 174. Inner ring portion 172 includes keyhole 178 defined in an outer surface thereof for aligning and positioning rotor 164 on inner ring portion 172 of resolver hub 162. Keyhole 178 may be a recessed portion in other embodiments. Rotor 164 includes: inner surface 180 and key or tab 182 extending radially inward therefrom. Key or tab 182 is sized and arranged for mating engagement with keyhole 178 of resolver hub 162. That is, key or tab 182 is configured to be disposed within, and received by, keyhole 178 when assembled on inner ring portion 172 of resolver hub 162. In this way, key or tab 182 in conjunction with keyhole 178 is configured to locate, or position, rotor 164 on resolver hub 162.

Rotor 164 further includes first axial side 184 and second axial side 186. Rotor 164 is axially retained on resolver hub 162 by staked portions 188 of resolver hub 162. That is, rotor 164 is assembled on inner ring portion 172 of resolver hub 162 such that first axial side 184 contacts annular wall 176 and staked portions 188 of inner ring portion 174 partially cover second axial side 186. Staked portions 188 represent material displaced from resolver hub 162 onto second axial side 186 of rotor 164 for axial retention thereof.

A method for assembling resolver assembly 160 may include press-fitting resolver hub 162 onto an outer surface of an impeller hub 158, wherein the resolver hub 162 may include inner ring portion 172, outer ring portion 174 disposed radially outward of inner ring portion 172, and annular wall 176 connecting inner ring portion 172 and outer ring portion 174. The method of assembly may also include locating rotor 164 on inner ring portion 172 by positioning key 182 extending radially inward from an inner surface of rotor 164 within keyhole 178 defined in an outer surface of inner ring portion 172. The method may further include displacing material from resolver hub 162 onto rotor 164 to axially retain rotor 164 on inner ring portion 172 of resolver hub 162. The method may include providing stator 166 axially aligned with rotor 164 and plate 168 arranged to fix stator 166 to bell housing 120. Plate 168 is fixed to bell housing 120 and stator 166 is clamped between plate 168 and bell housing 120. Rotor 164 may include first axial side 184 and a second axial side 186 opposite the first axial side; and locating rotor 164 on inner ring portion 172 includes arranging rotor 164 such that first axial side 184 contacts annular wall 176 of resolver hub 162. The method may include displacing material from resolver hub 162 onto second axial side 186 to axially retain rotor 164 on resolver hub 162. The steps provided above are a non-limiting example and are not required to be performed in the order provided.

Figure 4:
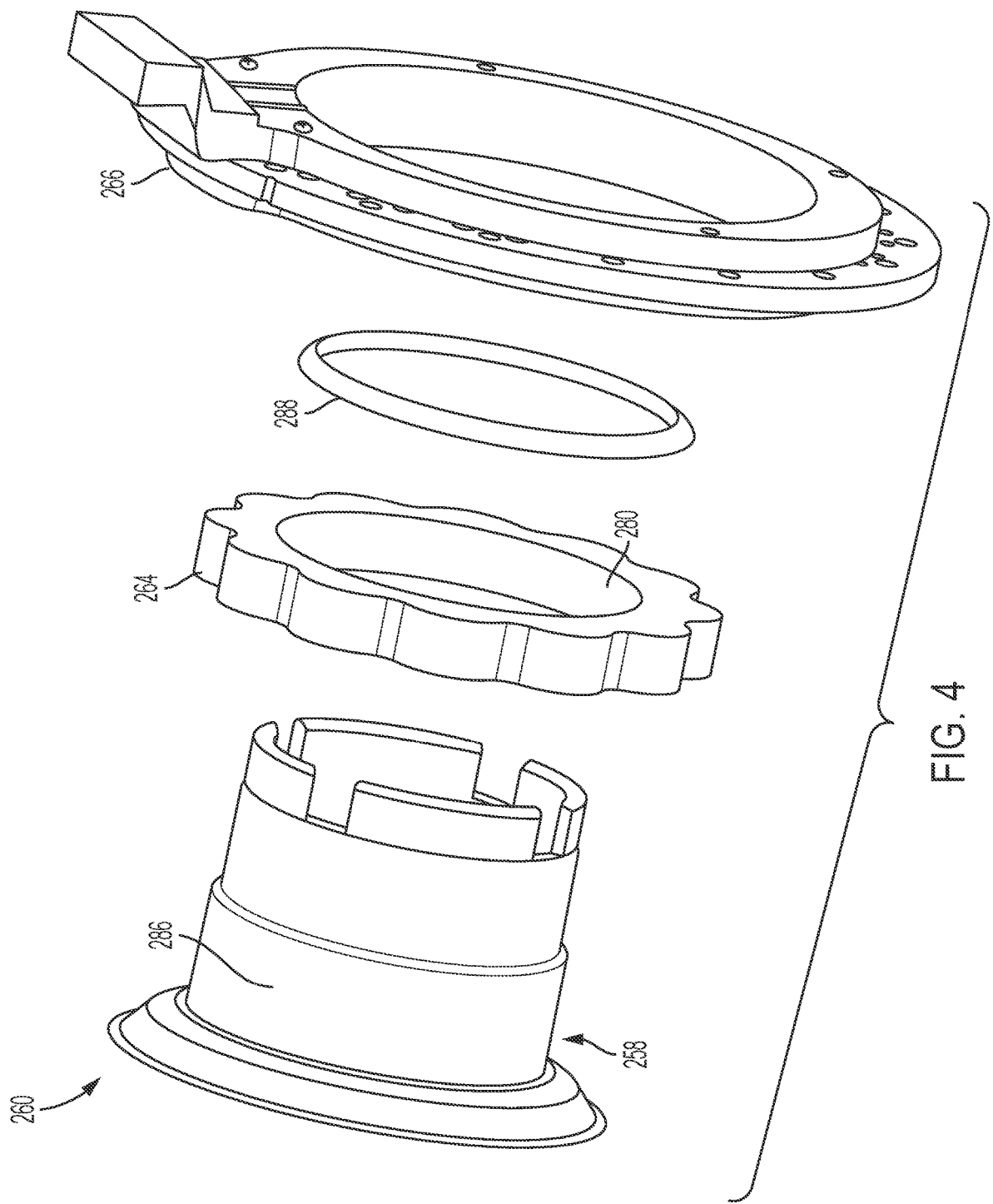
FIG. 4 is an exploded view of a resolver assembly attached to an impeller hub via a bonding method according to another embodiment of the present disclosure.
Figure 5:
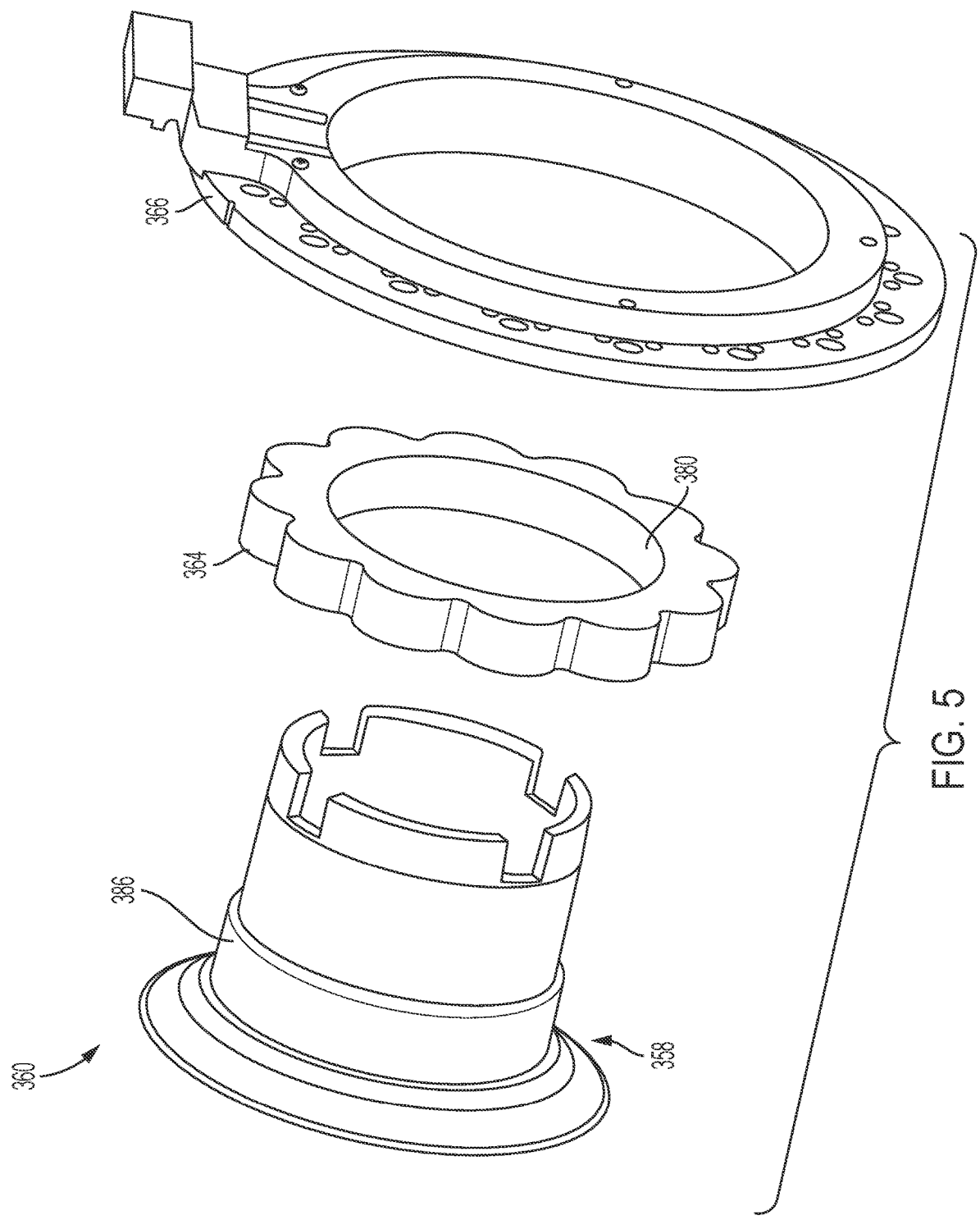
FIG. 5 is an exploded view of a resolver assembly attached to an impeller hub via a press-fit or shrink-fit connection according to another embodiment of the present disclosure.
Figure 6:
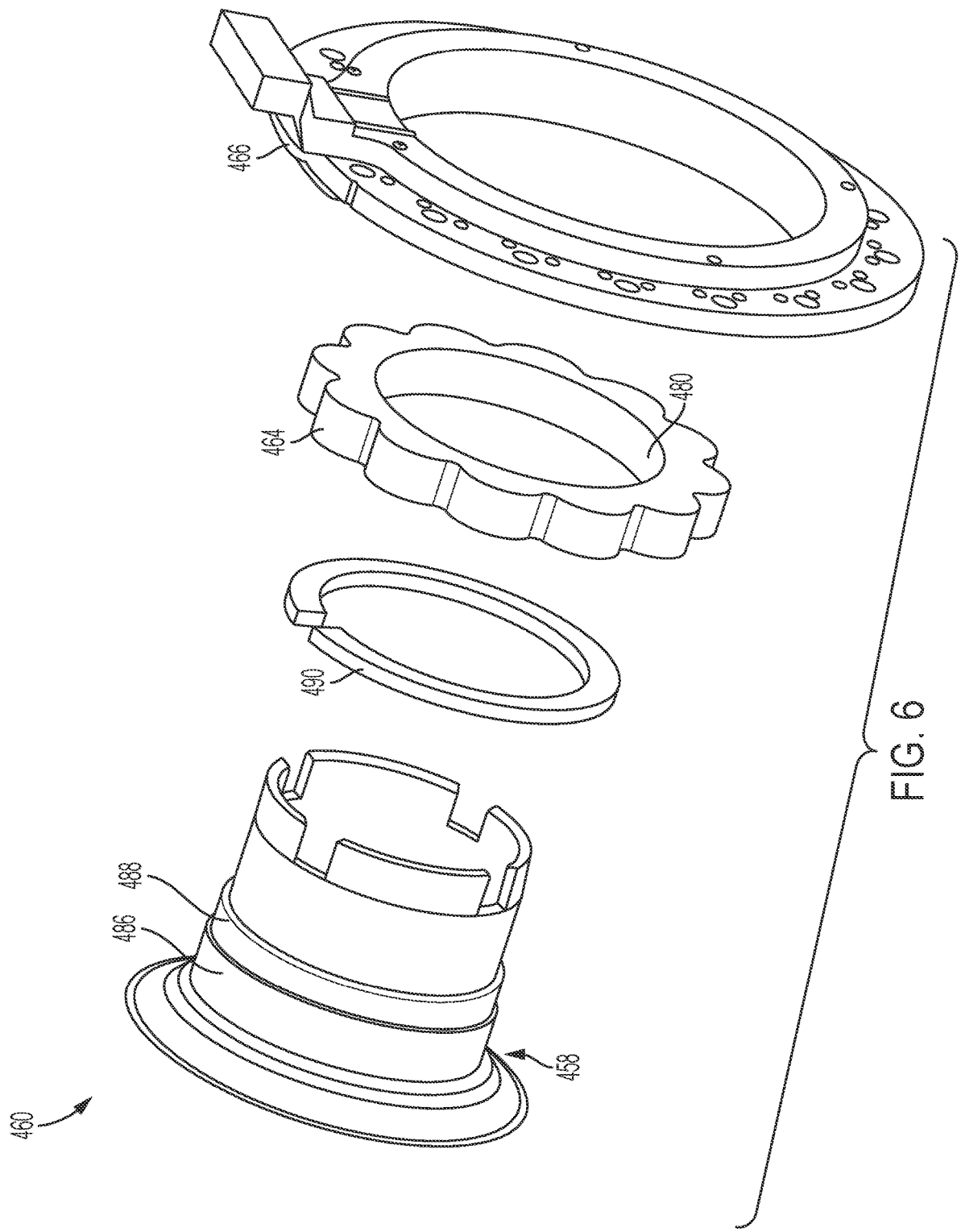
FIG. 6 is an exploded view of a resolver assembly attached to an impeller hub via a snap-ring connection according to another embodiment of the present disclosure.

FIGS. 4-6 provide alternative embodiments for attachment of a resolver assembly to an impeller hub of a torque converter. FIG. 4 is an exploded view of resolver assembly 260 attached to impeller hub 258 via a bonding method according to another embodiment of the present disclosure. Resolver assembly 260 includes rotor 264 and stator 266. In contrast to resolver assembly 160 shown in FIGS. 1-3 that includes rotor 164 connected to impeller hub 158 via rotor hub 162, rotor assembly 260 includes rotor 264 connected directly to outer surface 286 of impeller hub 258. That is, inner surface 280 of rotor 264 may be bonded to outer surface 286 of impeller hub 258 via material 288, which may be a bonding adhesive.

FIG. 5 is an exploded view of resolver assembly 360 attached to impeller hub 358 via a press-fit or shrink-fit connection according to another embodiment of the present disclosure. Resolver assembly 360 includes rotor 364 and stator 366. Rotor 364 includes inner surface 380 attached to outer surface 386 of impeller hub 358 via a press-fit or a shrink-fit connection. By press-fit, we mean inner surface 380 is press-fit onto outer surface 386. By shrink-fit, we mean inner surface 380 of rotor 364 is heated before assembly and then mounted on outer surface 386 of impeller hub 358. When inner surface 380 cools, it shrinks to fit outer surface 386.

FIG. 6 is an exploded view of resolver assembly 460 attached to impeller hub 458 via a snap-ring connection according to another embodiment of the present disclosure. In this embodiment, impeller hub 458 includes outer surface 486 and groove 488 defined therein. Resolver assembly includes rotor 464, stator 466, and snap ring 490. To assemble, rotor 464 is slid over impeller hub 458 such that inner surface 480 circumscribes outer surface 486 of impeller hub 458. Snap ring 490 is then inserted into groove 488 and is configured to retain and/or hold rotor 464 on outer surface 486 of impeller hub 458.

Embodiments disclosed herein provide a resolver assembly that is combined with the torque converter impeller hub to optimize the space available within a typical hybrid module. By use of a press fit on to the impeller hub of the torque converter, the rotation of the torque converter can supply the rotating function of the resolver needed to locate the position of the e-motor rotor. Specifically, the press fit onto the outside diameter of the impeller hub of the torque converter will retain the resolver rotor. By mounting the resolver stator to the bell housing, the bell housing then supplies the support and mounting needed for the stator. Whereas, the rotating motion of the torque converter supplies the rotational movement for the resolver rotor. In this way, when the torque converter rotates, the resolver has the rotational motion needed to properly locate the position of the e-motor's rotor.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 hybrid module
102 rotor assembly
104 stator assembly
106 rotor carrier
108 rotor segment
110 end ring
112 spring end plate
114 spring end plate
116 axially extending portion
118 radially extending portion
120 bell housing
122 stator carrier
124 stator segment
126 water jacket
127 sealed chamber
128 torque converter assembly
130 turbine
132 turbine shell
134 impeller
136 impeller shell
138 weld 140 lockup clutch
142 damper
144 stator
146 piston
148 clutch plates
150 springs
152 plate
154 plate
156 output
158 impeller hub
160 resolver assembly
162 resolver hub
164 resolver rotor
166 resolver stator
168 plate
170 connector
172 inner ring portion
174 outer ring portion
176 annular wall
178 keyhole
180 inner surface
182 key or tab
184 first axial side
186 second axial side
188 staked portions
258 impeller hub
260 resolver assembly
264 rotor
266 stator
280 inner surface
286 outer surface
288 material
358 impeller hub
360 resolver assembly
364 rotor
366 stator
380 inner surface
386 outer surface
458 impeller hub
460 resolver assembly
464 rotor
466 stator
480 inner surface
486 outer surface
488 groove
490 snap ring

What is claimed is:

1. A hybrid module, comprising:
   a housing;
   a torque converter comprising:
      a turbine having a turbine shell including at least one blade attached thereto;
      an impeller having an impeller shell including at least one blade attached thereto; and
      an impeller hub extending from a radial end of the impeller shell; and
   a resolver assembly comprising:
      a rotor connected to an outer surface of the impeller hub;
      a stator connected to the housing; and
      a resolver hub attached to the outer surface of the impeller hub, the resolver hub comprising:
         an inner ring portion;
         an outer ring portion disposed radially outward of the inner ring portion; and
         an annular wall connecting the inner ring portion and the outer ring portion;
   wherein the rotor is disposed and axially retained on the inner ring portion.

2. The hybrid module of claim 1, wherein:
   the resolver hub is press-fit onto the outer surface of the impeller hub.

3. The hybrid module of claim 1, wherein:
   the inner ring portion includes a keyhole defined in an outer surface thereof;
   the rotor includes an inner surface and a tab extending radially inward from the inner surface; and
   the tab extending radially inward from the inner surface of the rotor is arranged and configured to be received within the keyhole defined in the outer surface of the inner ring portion to position the rotor on the resolver hub.

4. The hybrid module of claim 1, wherein:
   the rotor includes a first axial wall and a second axial wall opposite the first axial wall;
   the first axial wall is configured to contact the annular wall of the resolver hub when disposed on the inner ring portion of the resolver hub; and
   the inner ring portion of the resolver hub includes staked portions partially covering the second axial wall for axial retention of the rotor on the resolver hub.

5. The hybrid module of claim 1, wherein the stator is axially aligned with the rotor and a plate is arranged to fix the stator to the housing.

6. The hybrid module of claim 5, further comprising a connector, wherein the connector fixes the plate to the housing and the stator is clamped between the plate and the housing.

7. The hybrid module of claim 6, wherein the connector is located radially outside of the stator.

8. The hybrid module of claim 1, wherein the rotor is bonded to the outer surface of the impeller hub.

9. The hybrid module of claim 1, wherein the rotor is connected to the outer surface of the impeller hub via a press-fit connection or a shrink-fit connection.

10. The hybrid module of claim 1, wherein:
    the resolver assembly further includes a snap ring;
    the impeller hub includes a groove defined in the outer surface; and
    the snap ring is configured to be disposed within the groove to axially retain the rotor on the outer surface of the impeller hub.

11. A method of assembling a resolver in a hybrid module having a housing and a torque converter including an impeller hub extending from a radial end of an impeller shell, the method comprising:
    attaching a resolver hub of the resolver to an outer surface of the impeller hub, wherein the resolver hub includes an inner ring portion, an outer ring portion disposed radially outward of the inner ring portion, and an annular wall connecting the inner ring portion and the outer ring portion;
    locating a rotor of the resolver on the inner ring portion by positioning a key extending radially inward from an inner surface of the rotor within a keyhole defined in an outer surface of the inner ring portion;
    aligning the rotor with a stator of the resolver in an axial direction; and
    fixing the stator of the resolver to the housing.

12. The method of claim 11, wherein the resolver hub is press-fit
    onto the outer surface of the impeller hub.

13. The method of claim 1, further comprising:
displacing material from the resolver hub onto the rotor to axially retain the rotor on the inner ring portion of the resolver hub.

14. The method of claim 1, wherein the rotor includes a first axial wall and a second axial wall opposite the first axial wall, and locating the rotor on the inner ring portion includes arranging the rotor such that the first axial wall contacts the annular wall of the resolver hub.

15. The method of claim 14, further comprising:
displacing material from the resolver hub onto the second axial wall to axially retain the rotor on the resolver hub.

16. The method of claim 11, further comprising:
providing a plate arranged to fix the stator to the housing.

17. The method of claim 16, wherein the plate is fixed to the housing and the stator is clamped between the plate and the housing.

18. The method of claim 11, further comprising:
bonding an inner surface of the rotor to the outer surface of the impeller hub.

19. The method of claim 11, further comprising:
press-fitting an inner surface of the rotor to the outer surface of the impeller hub; or
shrink-fitting the inner surface of the rotor to the outer surface of the impeller hub.

20. The method of claim 11, further comprising:
sliding the rotor over the impeller hub such that an inner surface of the rotor is disposed on the outer surface of the impeller hub; and
inserting a snap ring in a groove defined in the outer surface of the impeller hub for axial retention of the rotor on the impeller hub.

\* \* \* \* \*